US006803519B2

(12) United States Patent
de la Borbolla et al.

(10) Patent No.: US 6,803,519 B2
(45) Date of Patent: Oct. 12, 2004

(54) LATCHING AND ASSEMBLY STRUCTURE OF A COVER AND DUCT BASE IN A WIRING DUCT ASSEMBLY

(75) Inventors: Ian Rubin de la Borbolla, Memphis, TN (US); Wasim Khokhar, Cordova, TN (US); Kimberly Van Horn, Germantown, TN (US); Randy Vigos, Beaverton, OR (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 10/636,799

(22) Filed: Aug. 7, 2003

(65) Prior Publication Data

US 2004/0026104 A1 Feb. 12, 2004

Related U.S. Application Data

(60) Provisional application No. 60/401,681, filed on Aug. 7, 2002, and provisional application No. 60/415,794, filed on Oct. 3, 2002.

(51) Int. Cl.$^7$ ................................................. H02G 3/04
(52) U.S. Cl. ............................. 174/48; 174/95; 174/97; 174/68.3
(58) Field of Search ........................... 174/48, 49, 68.1, 174/68.3, 135, 72 A, 72 R, 72 C, 97, 96; 220/3.3, 3.8, 4.02, 4.01; 52/220.1, 220.3, 220.5, 220.7, 239

(56) References Cited

U.S. PATENT DOCUMENTS

| 3,126,444 A | * | 3/1964 | Taylor | 174/68.3 |
|---|---|---|---|---|
| 3,229,029 A | * | 1/1966 | Weiss | 174/68.3 |
| 3,705,949 A | * | 12/1972 | Weiss | 174/72 A |
| 3,761,603 A | | 9/1973 | Hays et al. | |
| 3,809,799 A | | 5/1974 | Taylor | |
| 3,890,459 A | * | 6/1975 | Caveney | 174/68.3 |
| 3,968,322 A | | 7/1976 | Taylor | |
| 4,136,257 A | | 1/1979 | Taylor | |
| 4,349,220 A | | 9/1982 | Carroll et al. | |
| 4,484,020 A | | 11/1984 | Lööf et al. | |
| 4,640,314 A | | 2/1987 | Mock | |
| 4,942,271 A | | 7/1990 | Corsi et al. | |
| 5,086,195 A | | 2/1992 | Claisse | |
| 5,089,667 A | | 2/1992 | Goussin et al. | |
| 5,235,136 A | | 8/1993 | Santucci et al. | |
| 5,802,672 A | | 9/1998 | Rohder | |
| 5,942,729 A | | 8/1999 | Carlson, Jr. et al. | |
| 5,949,025 A | | 9/1999 | Nagai et al. | |

(List continued on next page.)

FOREIGN PATENT DOCUMENTS

DE 3340520 * 6/1984 .................. 174/48

OTHER PUBLICATIONS

Edward P. Dyer "Modular Duct", Sep. 20, 2001 (US 2001/0022231).*
Carlon Nonmetallic Surface Raceway Catalog.

*Primary Examiner*—Dean A. Reichard
*Assistant Examiner*—Angel R. Estrada
(74) *Attorney, Agent, or Firm*—Hoffmann & Baron, LLP

(57) ABSTRACT

A wiring duct assembly including a duct base and cover for supporting wire and/or optical cable therein, defining a latching mechanism located on both the cover and duct base. The latching mechanism on the duct portion includes an inwardly projecting sidewall portion, a lip attached thereto and a projecting tip potion integrally attached to the lip. The sidewall, lip and tip define a groove for receiving the latching mechanism of the cover. The cover includes two opposing side walls wherein each side wall includes an inwardly extending portion for being received by a corresponding duct groove. The latching mechanism for the cover portion further includes protuberances in the interior surface of the cover for securing the tip portion of the duct side wall to provide secure latching of the cover and duct base during shipping, installation, and completion of assembly.

31 Claims, 5 Drawing Sheets

U.S. PATENT DOCUMENTS

| | | |
|---|---|---|
| 6,029,713 A | 2/2000 | Miranda |
| 6,107,576 A | 8/2000 | Morton et al. |
| D430,543 S | 9/2000 | Rohder |
| 6,198,043 B1 | 3/2001 | Hoffmann |
| D448,737 S | 10/2001 | Nakamura |
| 6,333,461 B1 | 12/2001 | Marcou et al. |
| 6,437,243 B1 * | 8/2002 | VanderVelde et al. ..... 174/68.3 |

* cited by examiner

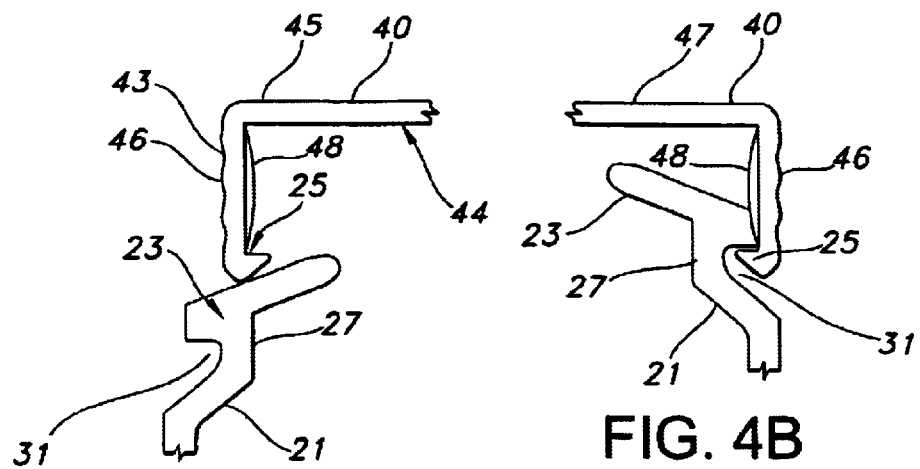
FIG. 4A
FIG. 4B
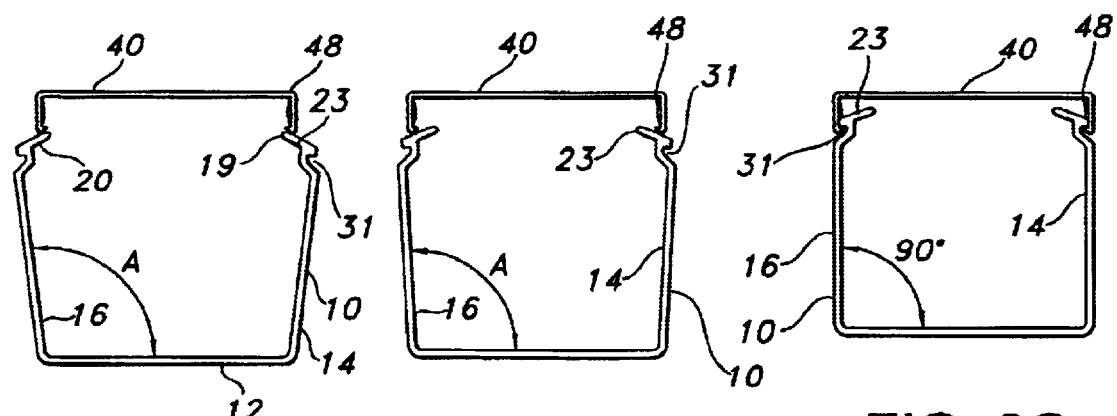
FIG. 3A
FIG. 3B
FIG. 3C

US 6,803,519 B2

LATCHING AND ASSEMBLY STRUCTURE OF A COVER AND DUCT BASE IN A WIRING DUCT ASSEMBLY

CROSS-REFERENCE TO RELATED APPLICATION

This application claims priority to U.S. Provisional Patent Application No. 60/401,681, filed on Aug. 7, 2002, and U.S. Provisional Patent Application No. 60/415,794, filed on Oct. 3, 2002, herein incorporated by reference.

FIELD OF THE INVENTION

The present invention relates generally to a wiring duct assembly for supporting electrical and/or optical cables therein, and more particularly to latching and assembly structure of the cover and the duct base of such wiring duct assembly.

BACKGROUND OF THE INVENTION

The use of plastic wiring or cable ducts to convey electrical wire and optical cables in telephone exchanges and similar applications, such as data transmission rooms and closets, factory ceilings and cable television head-ends is well known. More particularly, the use of high impact, thermoplastic cable duct including a U-shaped cross section having one latching mechanism at the top of each side wall and a separate top lid is known in the art. The majority of known ducts are assembled by first pushing in all the fingers, placing the lid below the fingers hook point, and then releasing the fingers to allow then to catch and latch to the lid. Such assembly becomes complicated if one could not press in all the fingers, or if fingers were left without being pushed. This leaves fingers protruding outside of the lid.

The known assembly requires the mating of two interfaces that are designed to mate by manipulating the sidewalls by flexing in the fingers of the duct while at the same time keeping the lid aligned with the duct's body. The assembly of the cable duct with the conventional lid is time-consuming and difficult requiring the user to use one hand to manipulate the cable duct by depressing the sidewalls of the duct and the other hand to align the lid over the duct and to effect engagement of the lid. A problem with prior art detachable top lids is the tendency to damage the lid and duct during attachment to the cable duct when it is necessary to access electrical wire and/or optical cables contained within the cable duct. A further problem in the prior art is the improper attachment of the lids causes the lids to disengage from the cable duct, and have a tendency to become lost.

Applicant has overcome the shortcomings of prior art cable duct and lids with the present invention including a latching and assembly of the duct base and cover for the duct assembly which is adapted to be closed without requiring the complicated step of manipulating the side walls of the duct prior to and during the attachment of the cover.

BRIEF DESCRIPTION OF THE DRAWINGS

FIGS. 3A, B, and C are end views of the wiring duct assembly of FIG. 1 in successive stages, respectively, of the duct assembly.

FIGS. 4A and B are enlarged partial end views of the latching mechanism of the wiring duct assembly shown prior to and in assembly, respectively.

DETAILED DESCRIPTION OF THE PREFERRED EMBODIMENTS

Figure 1:
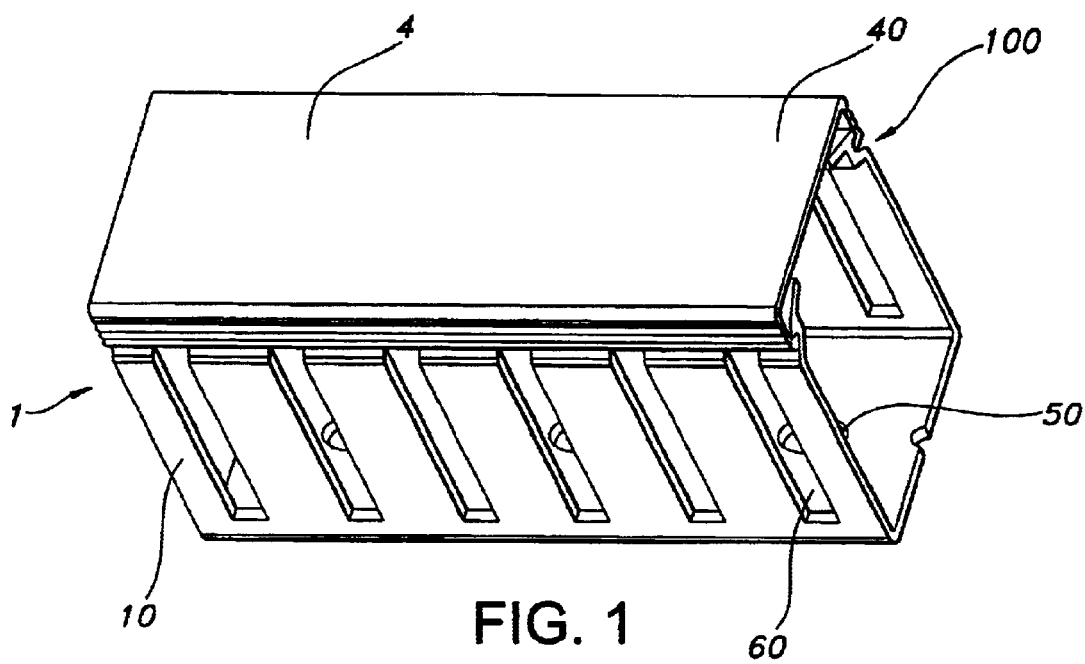
FIG. 1 is a top perspective view of a wiring duct assembly including a duct base and cover of the present invention.
Figure 2:
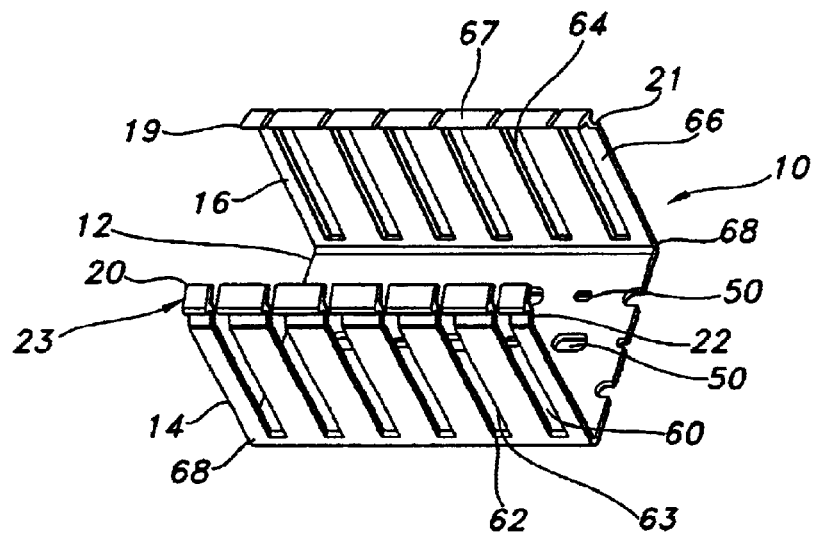
FIG. 2 is a top perspective view of the duct base of the wiring duct assembly of FIG. 1.

Referring now to the drawing, there is shown in FIG. 1, a wiring duct assembly 1 including a duct base 10 and a cover 40 with a complementary latching mechanism 100 on both the duct 10 and the cover 40. In FIG. 2 the duct base 10 is shown, generally in the form of a U-shaped channel, with a bottom portion 12 and a pair of sidewalls 14 and 16 attached to the bottom portion 12. The U-shaped channel 10 may be made of any appropriate material such as sheet metal, substantially hard rubber, or preferably a plastic. Preferably, the duct base 10 is extruded in elongated sections several feet long and, subsequently, at least one sidewall thereof is provided with a plurality of longitudinally spaced slits, shown generally at 60, through the sidewall 14, such as by means of conventional punch and die apparatus.

As shown in FIG. 2, slits 60 are cut-away portions of the sidewalls 14 and 16. The slits 60 are disposed in a regular pattern, substantially equidistant from each other. Each of the longitudinally spaced slits 60 has a pair of opposed sides 62 and 63 substantially parallel and symmetrically mirroring each other, the two opposed sides 62 and 63 being joined proximate the bottom portion 12. Each slit 60 extends to the side walls 14 unattached distal end 19 and 20 of the duct base 10. The plurality of slits 60 cut from the sidewall, 14 and 16, thus leaves remaining portions of the sidewall between consecutive slits which form finger-like members 66, each having a pair of substantially parallel sides 64 and 67. Each finger-like member 66 is integrally connected to the remaining portions of the sidewall 14 by way of a relatively wide section 68, adjacent the bottom portion 12.

The sidewalls 14 and 16, at their distal unattached end 19 and 20, respectively, have an inwardly bent portion 21 and 22. FIG. 4A shows the inwardly bent potion 21 having a lip 27 which extends substantially parallel to the side walls 14 and 16. The lip 27 terminates in an inwardly projecting integral tip 23, adapted to guide the cover 40 into place and interlock with the duct base 10. FIG. 4A shows a groove 31 in the duct side walls 14 and 16 which is geometrically defined by the bent portion 21, the lip 27 and the projecting tip 23 for receiving the corresponding latching mechanism portion of the cover 40.

The cover 40 has a top 47 attached to two opposing downwardly depending side walls 46, with an interior surface 44 and an exterior surface 45. The cover 40 has a latching mechanism for the cover portion which includes an inwardly extending flange 25 adjacent to the unattached edge of the cover side walls 46 for being received by a corresponding groove 31 of the duct side wall. The cover 40 further includes protuberances 48 which provides a frictional surface against the tip 23. The protuberances 48 are a series of convex protruding bumps located along the length of the interior surface 44 of the cover 40. It should be appreciated that the protuberances 48 can be a series of individual solid protrusions or a series of individual hollow bubble-like protrusions made from material which is durable and compatible with the material of the cover 40. The protuberances 48 provide assistance in securing the cover 40 to the duct base 10 and reduced slippage once assembled. The cover side walls 46 are substantially rigid and adapted to be disengagingly raised from its associated groove 31 so as to open the cover 40 of the wiring duct assembly 1 for easy access thereto.

The cover 40 is further provided with cover ridges 43 on the exterior surface 45 of the cover sidewalls 46 as shown in FIG. 4A. The ridges 43 are a raised grip area which allow for a better hold of the cover 40 for assembly and disassembly purposes. The cover ridges 43 enables the user to maneuver the product more efficiently.

The wiring duct assembly 1 is adapted to be easily closed for containment of electrical wires and/or optical cables therein by the lead-in geometry of tip 23 on the duct side wall 14 which slidably guides the cover 40 into position to snap into the groove 31 of the duct without requiring a separate step of manually manipulating the duct side walls, such assembly being schematically depicted by FIG. 3A, B, C. In FIG. 3A the initial latching action in shown by aligning the cover 40 above the duct base 10. The cover 40 is pushed until it comes in contact with the projecting tip 23. As also shown in FIG. 4A, the angle of the surface of the tips aids the cover 40 to properly begin seating into the duct base 10. At the same time, the projecting tip 23 begins to move inwardly, as shown in FIG. 3B. The applied inward force is concentrated on the projecting tip 23 and cover 40 intersecting point. The cover 40 continues to be pushed until the edge of the cover rests in the corresponding groove 31 of the projecting tip 23, as shown in FIG. 3C and FIG. 4B. The lead-in geometry of the tip 23 solve the prior art problems of damage to the duct and cover by guiding the cover 40 and all the finger-like members 66 to properly mate therewith. This further eliminates the difficult steps of the prior art which includes manually manipulating the duct side walls, aligning the cover over the duct base and properly mating and securing the two interfaces.

As shown in FIG. 3A, the sidewalls 14 and 16 of the U-shaped channel forming the duct base 10 have a normal tendency, when the cover 40 is removed, to form planes generally converging towards the bottom portion 12 of the duct base 10. The angle A of the sidewalls 14 and 16 attachment to the bottom portion 12 of the duct base 10 range from about 92 degrees to about 120 degrees. The angle A facilitates the snapping of the cover 40 on the duct base 10 once the installation is completed. As the cover 40 is being placed on the duct base 10, unattached edges 19 and 20 of the sidewalls 14 and 16 are guided closer together as shown in FIG. 3B. When the cover 40 is latched into place with the duct base 10, the width of the cover 40 is such that the sidewalls 14 and 16 become generally parallel to each other once the cover is in position, as shown in FIG. 3C. The spring back of the duct side walls 14 and 16 assist in snapping and securing the cover 40 in place, while the protuberances 48 of the cover provides reduced slippage between the cover 40 and the duct base 10.

The bottom portion 12 of the duct base 10 is provided with a plurality of mounting apertures 50, as best shown in FIG. 2, for mounting of the channel on an appropriate support panel within an electrical cabinet or on a control panel.

Figure 5:
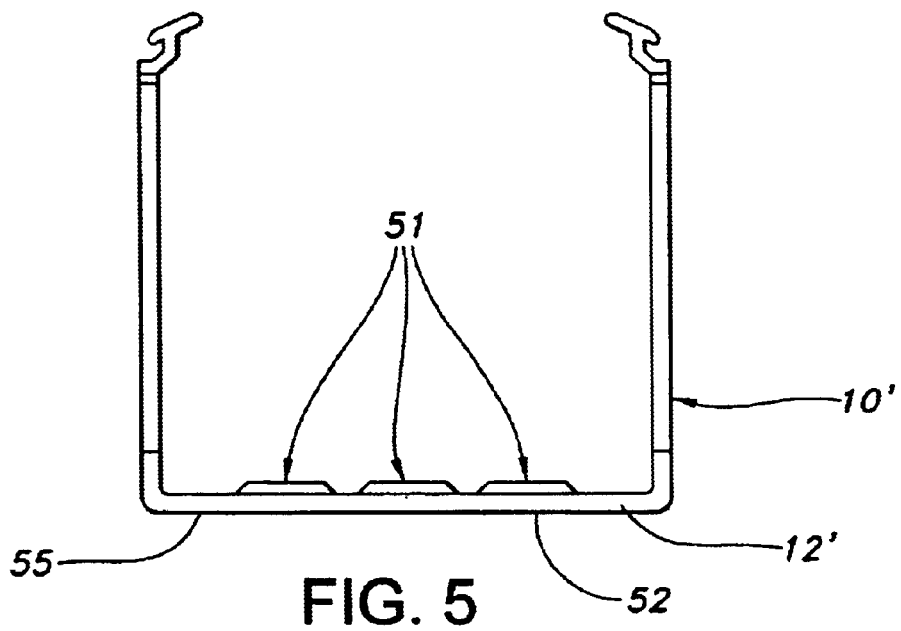
FIG. 5 is an end view of a further embodiment of the wiring duct showing details of the duct.
Figure 6:
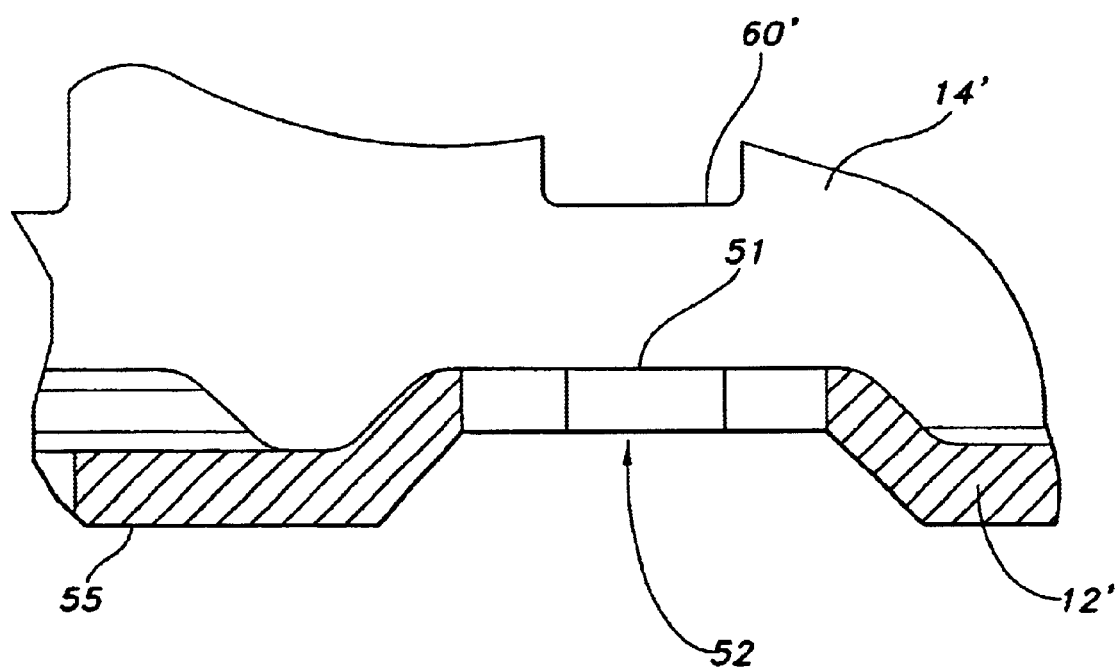
FIG. 6 is an enlarged partial cross-sectional view of the duct base of FIG. 5 showing a recess boss located on the bottom portion of the duct base.

FIG. 5 shows another embodiment of the duct base 10' which is similar to FIG. 2, but further includes recess bosses 51 located on the bottom portion 12' of the duct base 10' to provide for variations on attaching the base 10' to a support structure. FIG. 5 shows three recess bosses 51 but it should be appreciated that more or less recess bosses can be used. As shown in FIG. 6, the base duct 10' has an interior surface and exterior surface 55. The recess boss 51 is defined by a concave portion 52 entering into the bottom exterior surface 55 from below. The concave portion 52 provides for a space between the bottom exterior surface 55 of the base duct 10' and the support structure to be attached thereto. The concave portion 52 provides for a space for adaptors to be placed in or attached thereto, while allowing the bottom exterior surface 55 of the duct base 10' to remain substantially flush with the support structure upon mounting of the duct base 10' to the support structure. The adaptor allows the duct base 10' to be attached to the support structure by a variety of different securing devices.

Figure 7:
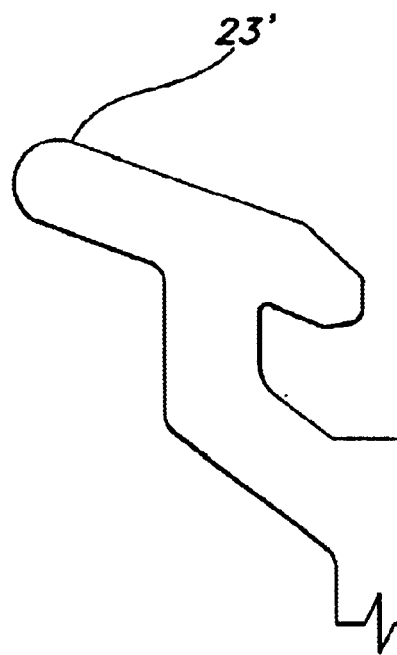
FIG. 7 is an enlarged partial view of the distal end of the duct base of FIG. 5 showing details of the tip located on the side wall of the duct base.
Figure 8:
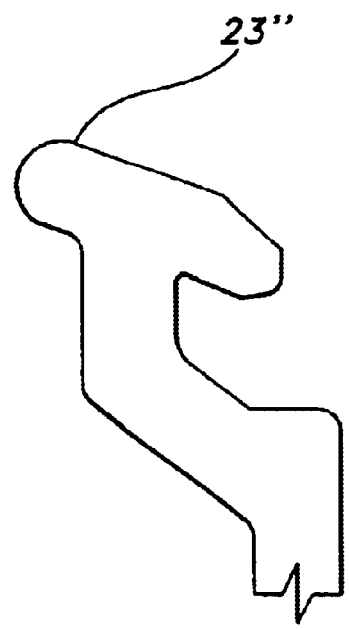
FIG. 8 is an enlarged partial view of the distal end of the duct base in accordance with a further embodiment thereof.
Figure 9:
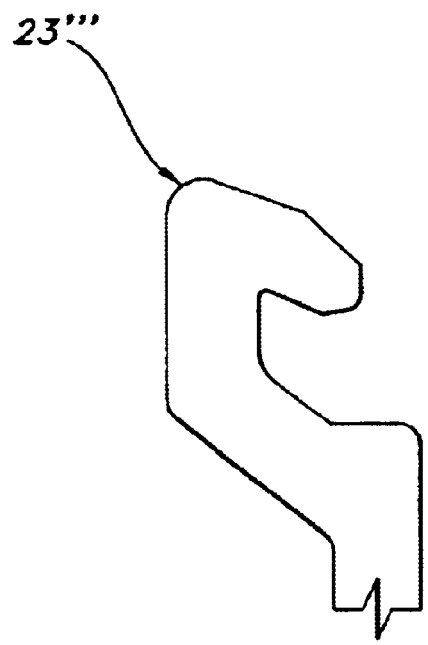
FIG. 9 is an enlarged partial view of the distal end of the duct base in accordance with a further embodiment thereof.

FIG. 7 shows a tip 23' from FIG. 5 which is longer to provide more lead-in geometry, FIG. 8 shows a tip 23" which has a shorter lead-in geometry, while FIG. 9 shows tip 23''' with the least amount of lead-in geometry. The desired length of lead-in geometry depends on the thickness of the tip and rigidity of the tip material. The thicker the tip and the more rigid the material, the longer lead-in geometry is desired for the tip to provide for more guidance for the cover while it pulls the duct side walls inwardly to attach; (as shown in FIGS. 3A, B, C). The thinner, more flexible the tip, the less length of lead-in geometry is needed for the tip, because the side walls are easier to maneuver with the cover during attachment thereto.

Figure 10:
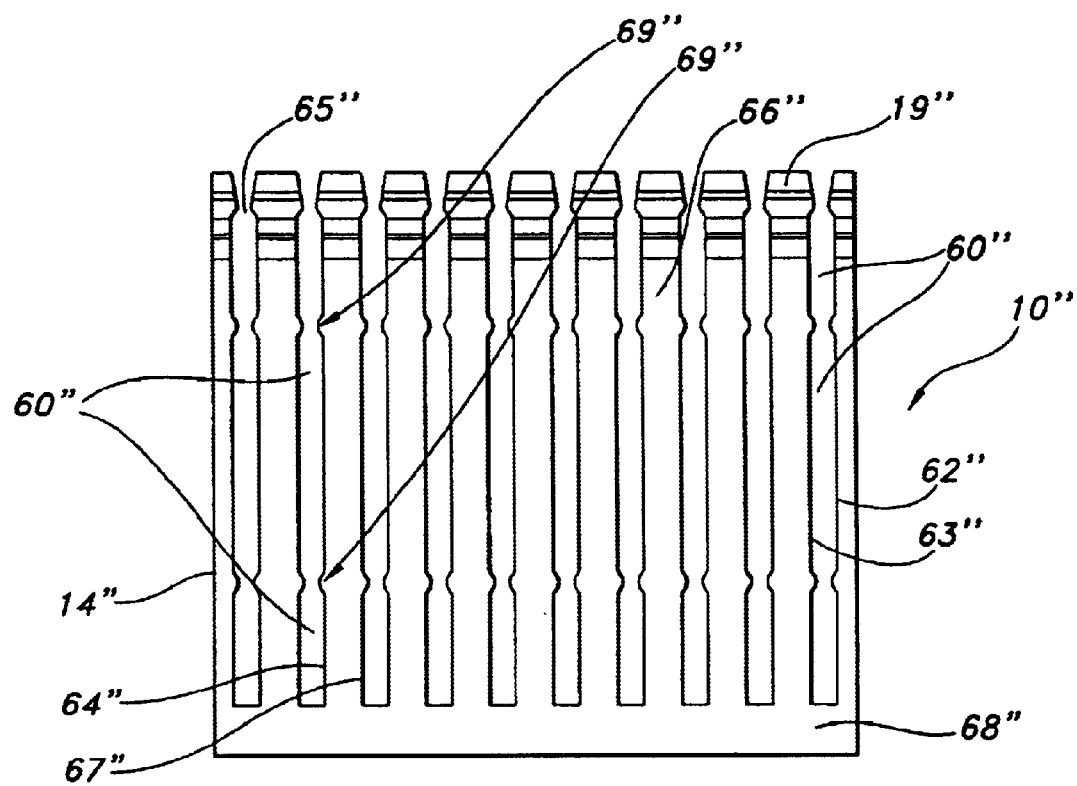
FIG. 10 is a side elevation view of a further embodiment of a duct base showing slits in the side wall and nubs protruding therein.

In FIG. 10 another embodiment of the duct base is shown which is similar to the embodiment shown in FIG. 2, but the slits 60" include narrow gaps 65" and nubs 69". At the unattached ends 19" of the sidewall 14" each slit 60" opens into the narrow gap 65" progressively widening the sides 62" and 63" of the slit 60". The sides 62" and 63" of each slit 60" include in a preferred arrangement the restrictive nubs 69" to allow for wire positioning. The nubs 69" are a pair of opposed, wedge type configurations disposed at various points along the sides, 62" and 63", of each slit 60". In FIG. 10 two pair of restrictive nubs 69" are shown, and the narrow gaps 65" define restrictive slot features in the duct side walls to allow for more versatility for wire positioning. The wires are positioned between the desired restrictive nubs 69" for proper placement within the slit 60". In this manner, the emerging electrical conductors remain trapped through the slit 60", are prevented from escaping from the slit, even though the cover may be removed from the duct base 10". The width of the gap 65" is formed to be less than the outer diameter of the electrical conductor, and, as most electrical installations generally utilize wires or electrical conductors all of the same dimension, a predetermined gap may be used which provides effective holding of the electrical conductors passing through the slit 60". Furthermore, once the cover is snapped into position, it operates as an additional effective means for preventing any electrical conductor from escaping from the slits.

The manner in which the present invention is used, such as with mounted and running wire, is similar to that known in the art. Generally, the duct base 10 defined by the U-shaped channel is mounted on a support panel by means of fasteners such as screws passed through the mounting apertures 50 in the bottom portion 12. A plurality of insulated electrical conductors is routed through the duct base 10 such as to establish electrical connections between diverse elements of the electrical installation. Where it is desirable to route a particular conductor to the exterior of the wiring duct 1, the appropriate conductor is passed through a slit 60 proximate the electrical element to which it is to be connected. This is best accomplished by deflecting a finger-like member 66 inwardly or preferably outwardly in a direction normal to the longitudinal axis of the duct such as slit 60 is sufficient width permitting passage of an electrical conductor through the opening. The substantially flexible finger-like member 66 is allowed to snap back to its original position.

Wiring ducts may be made in different sizes. For example, the sidewall height may extend from three quarters of an inch or less to four inches or more, with comparable variations of width of the channels. In ducts having a substantial sidewall height, and where it is desired to have relatively closely spaced slits, the included angle between opposite lateral sides of the slit will be comparatively less than is the case in ducts having a substantially short sidewall height, where it is desired to have more widely spaced slits.

It should also be appreciated that the present invention may include various markings (not shown) which may be printed on the cover 40 or the duct base 10 to provide product and length information to allow easy access to instructional assembly information and measurement markings and to reduce installation time and assist in accurate installation.

It should also be appreciated that the present invention may include a protective tape (not shown) which may be removably attached to the exterior surface 45 of the cover 40 to protect the exterior surface 45 and to allow the user to write on the tape surface without damaging or permanently marking the exterior surface 45 of cover 40.

Having described the preferred embodiments herein, it should now be appreciated that variations may be made thereto without departing from the contemplated scope of the invention. Accordingly, the preferred embodiments described herein are deemed illustrative rather than limiting, the true scope of the invention being set forth in the claims appended hereto.

What is claimed is:

1. A wiring duct assembly comprising:
   a duct base having a bottom portion and a pair of upstanding deflectable sidewalls defining an open-ended duct interior therebetween, each of said sidewalls including a distal end having an externally directed tapered surface including a projecting tip having an inwardly directed portion including lead-in geometry; and
   a cover having a top for covering said open end of said duct base and a pair of opposing depending portions for substantial simultaneous engagement with said tapered surfaces of said distal end of said sidewalls for deflecting said sidewalls inwardly, said depending portions of said cover and said distal ends of said sidewalls defining a cooperative latching means for guiding said cover for mating with said sidewalls and for attaching said cover to said duct base upon said inwardly deflecting of said sidewalls.

2. The wiring duct assembly of claim 1 wherein said cooperative latching means comprises a groove at said distal ends of said sidewalls, and an inwardly extending flange depending from said depending portions of said cover for allowing said groove to receive said flange in an attachable manner securing said cover to said duct base.

3. The wiring duct assembly of claim 1 wherein said cooperative latching means comprises an inwardly directed bent portion of said sidewalls at said distal end, a lip depending from said bent portion and substantially parallel to said sidewalls, and said projecting tip depending from and extending across said lip, said projecting tip having an externally directed portion, wherein said externally directed portion of said projecting tip, said lip and said bent portion define said groove; and an inwardly extending flange depending from said depending portions of said cover, said flange being received by said groove in an attachable manner for removably securing said cover to said duct base.

4. The wiring duct assembly of claim 1 wherein said inwardly directed portion of said projecting tip curving upward providing frictional contact with said cover upon attachment of said cover.

5. The wiring duct assembly of claim 1 wherein said inwardly directed portion of said projecting tip is longer then said externally directed portion of said projecting tip.

6. The wiring duct assembly of claim 1 wherein said inwardly directed portion of said projecting tip is substantially the same length as said externally directed portion of said projecting tip.

7. The wiring duct assembly of claim 1 wherein said sidewalls deflect from said bottom portion at an interior angle ranging from about 92 to about 120 degrees.

8. The wiring duct assembly of claim 1 wherein said sidewalls of said duct base comprise a plurality of finger-like member defined by spaced apart slits formed in at least one of said sidewalls.

9. The wiring duct assembly of claim 8 wherein said finger-like member extend from said bottom portion to said distal end of said sidewalls, said finger-like member being spaced apart from each consecutive finger-like member.

10. The wiring duct assembly of claim 8 wherein said finger-like member having nubs protruding from said finger-like member defining a narrower slit portion between consecutive finger-like member.

11. The wiring duct assembly of claim 1 wherein said sidewalls of said duct base comprise a plurality of finger-like member defined by spaced apart slits formed in a portion of said sidewalls.

12. The wiring duct assembly of claim 1 wherein said bottom portion of said duct base having a plurality of apertures therethrough.

13. The wiring duct assembly of claim 1 wherein said cover further comprises protuberance providing a frictional surface against said distal ends of said sidewalls.

14. The wiring duct assembly of claim 13 wherein said protuberance being located on an inner surface of said depending portions of said cover.

15. The wiring duct assembly of claim 13 wherein said protuberances comprise a series of individual convex protrusions on said cover.

16. The wiring duct assembly of claim 1 wherein said depending portions of said cover having externally directed ridges for gripping said cover.

17. The wiring duct assembly of claim 1 wherein said cover having a removable film attached thereto.

18. The wiring duct assembly of claim 1 wherein said duct base comprises a material selected from a group consisting of plastic, rubber, and metallic materials.

19. A wiring duct assembly comprising:
   a duct base having a bottom portion and a pair of upstanding deflectable sidewalls defining an open-ended duct interior therebetween, each of said sidewalls including a distal end having an externally directed groove defined by said sidewalls and a tapered surface including a projecting tip having an inwardly directed portion including lead-in geometry; and a cover having a top for covering said open end of said duct base and a pair of opposing depending portions having an inwardly directed flanges guided by said tapered surface for providing guidance for said flange and for deflecting said sidewalls inwardly, said flange of said cover and said groove of said sidewalls cooperatively securing upon inwardly deflecting of said sidewalls and attaching said cover thereto.

20. The wiring duct assembly of claim 19 wherein said cover further comprises protuberance providing a frictional surface against said distal ends of said sidewalls.

21. A wiring duct assembly comprising:

a duct base having a bottom portion and a pair of upstanding deflectable sidewalls defining an open-ended duct interior therebetween, each of said sidewalls including a distal end having an externally directed tapered surface including a projecting tip having an inwardly directed portion including lead-in geometry, said bottom portion having a recess boss and aperture therethrough, said recess boss defining an externally directed concave portion of said bottom portion for providing a space for an adaptor while allowing said bottom portion to remain substantially flush with a surface of a support structure mounted thereto; and a cover having a top for covering said open end of said duct base and a pair of opposing depending portions for substantial simultaneous engagement with said tapered surfaces of said distal ends of said sidewalls for deflecting said sidewalls inwardly, said depending portions of said cover and said distal end of said sidewalls defining a cooperative latching means for guiding said cover for mating with said sidewalls and for attaching said cover to said duct base upon said inwardly deflecting of said sidewalls.

22. The wiring duct assembly of claim 21 wherein said distal end having an internally directed tapered surface depending from said externally directed tapered surface for providing guidance of said flange of said cover for deflecting said sidewalls internally.

23. The wiring duct assembly of claim 21 wherein said sidewalls deflect from said bottom portion at an interior angle ranging from about 92 to about 120 degrees.

24. The wiring duct assembly of claim 23 wherein said sidewalls of said duct base comprise a plurality of finger-like member defined by spaced apart slits formed in at least one of said sidewalls.

25. The wiring duct assembly of claim 24 wherein said finger-like member having nubs protruding from said finger-like member defining a narrower slit portion between consecutive finger-like member.

26. The wiring duct assembly of claim 21 wherein said cover further comprises protuberance providing a frictional surface against said distal ends of said sidewalls.

27. The wiring duct assembly of claim 26 wherein said protuberance being located on an inner surface of said depending portions of said cover.

28. The wiring duct assembly of claim 26 wherein said protuberances comprise a series of individual convex protrusions on said cover.

29. The wiring duct assembly of claim 21 wherein said bottom portion of said duct base having a plurality of apertures therethrough.

30. The wiring duct assembly of claim 21 wherein said depending portions of said cover having externally directed ridges for gripping said cover.

31. The wiring duct assembly of claim 21 wherein said cover having a removable film attached thereto.

* * * * *